(12) United States Patent  
Umemoto (10) Patent No.: US 8,346,745 B2  
(45) Date of Patent: Jan. 1, 2013

(54) INFORMATION RETRIEVAL METHOD, COMPUTER READABLE MEDIUM AND INFORMATION RETRIEVAL APPARATUS

(75) Inventor: Hiroshi Umemoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 219 days.

(21) Appl. No.: 12/767,198

(22) Filed: Apr. 26, 2010

(65) Prior Publication Data

US 2011/0131214 A1 Jun. 2, 2011

(30) Foreign Application Priority Data

Nov. 30, 2009 (JP) ................................ 2009-272471

(51) Int. Cl.
*G06F 17/30* (2006.01)
*G06F 17/00* (2006.01)

(52) U.S. Cl. ........ 707/705; 707/706; 707/713; 707/741; 707/748; 707/754; 707/769

(58) Field of Classification Search .................. 707/705, 707/706, 713, 741, 748, 754, 769
See application file for complete search history.

(56) References Cited

U.S. PATENT DOCUMENTS

| 6,728,707 B1* | 4/2004 | Wakefield et al. ................ 1/1 |
| 7,526,425 B2* | 4/2009 | Marchisio et al. .............. 704/9 |
| 7,558,778 B2* | 7/2009 | Carus et al. .................... 1/1 |

FOREIGN PATENT DOCUMENTS

JP  A-2008-21270  1/2008

\* cited by examiner

*Primary Examiner* — Yicun Wu (74) *Attorney, Agent, or Firm* — Oliff & Berridge, PLC (57) ABSTRACT

According to an aspect of the invention, a computer readable medium stores a program causing a computer to execute a process for retrieving information. The process includes an extracting process, an executing process, a first creating process, a second creating process, a determining process. The extracting process extracts, from a first composition that is an object to be searched for and that includes first sentence elements and a second composition that indicates a retrieval condition and that includes second sentence elements, the first sentence elements, the second sentence elements, and sentence element relations indicating relations between the first sentence elements and relations between the second sentence elements.

5 Claims, 9 Drawing Sheets

The necessity of an influenza vaccine rises.

Company B succeeds in the development of the vaccine ahead of the major pharmaceutical companies.

| RELATION NO. | SENTENCE NO. | SENTENCE ELEMENT RELATION | SENTENCE ELEMENT "1" | SENTENCE ELEMENT "2" | RELATION PROPERTY |
|---|---|---|---|---|---|
| P1 | 1 | SUBJECT | rise:1 | necessity:1 | DYNAMIC |
| P2 | 1 | ADNOMINAL"of" | necessity:1 | vaccine:1 | STATIC |
| P3 | 1 | ADNOMINAL | vaccine:1 | influenza:1 | STATIC |
| P4 | 2 | SUBJECT | ahead:1 | company B:1 | DYNAMIC |
| P5 | 2 | TARGET "of" | ahead:1 | company:1 | DYNAMIC |
| P6 | 2 | ADNOMINAL | company:1 | major:1 | STATIC |
| P7 | 2 | ADNOMINAL | company:1 | pharmaceutical:1 | STATIC |
| P8 | 2 | SUBJECT | succeed:1 | company B:1 | DYNAMIC |
| P9 | 2 | TARGET"in" | succeed:1 | development:1 | DYNAMIC |
| P10 | 2 | ADNOMINAL"of" OBJECT | development:1 | vaccine:2 | DYNAMIC |
| P11 | 2 | SUBJECT | development:1 | company B:1 | DYNAMIC |

What is the company which developed the vaccine of influenza?

| RELATION NO. | SENTENCE NO | SENTENCE ELEMENT RELATION | SENTENCE ELEMENT "1" | SENTENCE ELEMENT "2" | RELATION PROPERTY |
|---|---|---|---|---|---|
| Q1 | 1 | SUBJECT | develops:1 | company:1 | DYNAMIC |
| Q2 | 1 | OBJECT | develops:1 | vaccine:1 | DYNAMIC |
| Q3 | 1 | ADNOMINAL "of" | vaccine:1 | influenza:1 | STATIC |

「What department is taking measures to the influenza?」

| RELATION NO. | SENTENCE NO. | SENTENCE ELEMENT RELATION | SENTENCE ELEMENT "1" | SENTENCE ELEMENT "2" | RELATION PROPERTY |
|---|---|---|---|---|---|
| Q1 | 1 | SUBJECT | take:1 | department:1 | DYNAMIC |
| Q2 | 1 | OBJECT | take:1 | measures:1 | DYNAMIC |
| Q3 | 1 | TARGET "TO" | measures:1 | influenza:1 | STATIC |

INFORMATION RETRIEVAL METHOD, COMPUTER READABLE MEDIUM AND INFORMATION RETRIEVAL APPARATUS

CROSS-REFERENCE TO RELATED APPLICATIONS

This application is based upon and claims priority under 35 USC 119 from Japanese Patent Application No. 2009-272471, filed Nov. 30, 2009.

BACKGROUND

1. Technical Field

The present invention relates to an information retrieval method, a computer readable medium and an information retrieval apparatus.

2. Related Art

There has been proposed technology wherein information is retrieved with retrieval conditions being the semantic relation between sentence elements such as a word and a phrase, and a concept stipulated by the semantic relation.

SUMMARY OF THE INVENTION

According to an aspect of the invention, a computer readable medium stores a program causing a computer to execute a process for retrieving information. The process includes an extracting process, an executing process, a first creating process, a second creating process, a determining process.

The extracting process extracts, from a first composition that is an object to be searched for and that includes first sentence elements and a second composition that indicates a retrieval condition and that includes second sentence elements, the first sentence elements, the second sentence elements, and sentence element relations indicating relations between the first sentence elements and relations between the second sentence elements.

The executing process executes a syntactic analysis with respect to the first composition and the second composition;

The first creating process creates composition index information indicating the first sentence elements and the sentence element relations between the first sentence elements based on a result of the syntactic analysis;

The second creating process creates retrieval condition information indicating the second sentence elements and the sentence element relations between the second sentence elements based on the result of the syntactic analysis; and The determining process determines the first composition corresponding to the composition index information as a retrieval result for the retrieval condition, when a pair of the sentence elements included in the retrieval condition information and having the sentence element relation of predetermined property corresponds to a pair of the sentence elements included in the composition index information.

BRIEF DESCRIPTION OF THE DRAWINGS

Exemplary embodiments of the invention will be described in detail based on the following figures, wherein.

DETAILED DESCRIPTION

[First Exemplary Embodiment]
(Configuration of Information Retrieval System)

Figure 1:
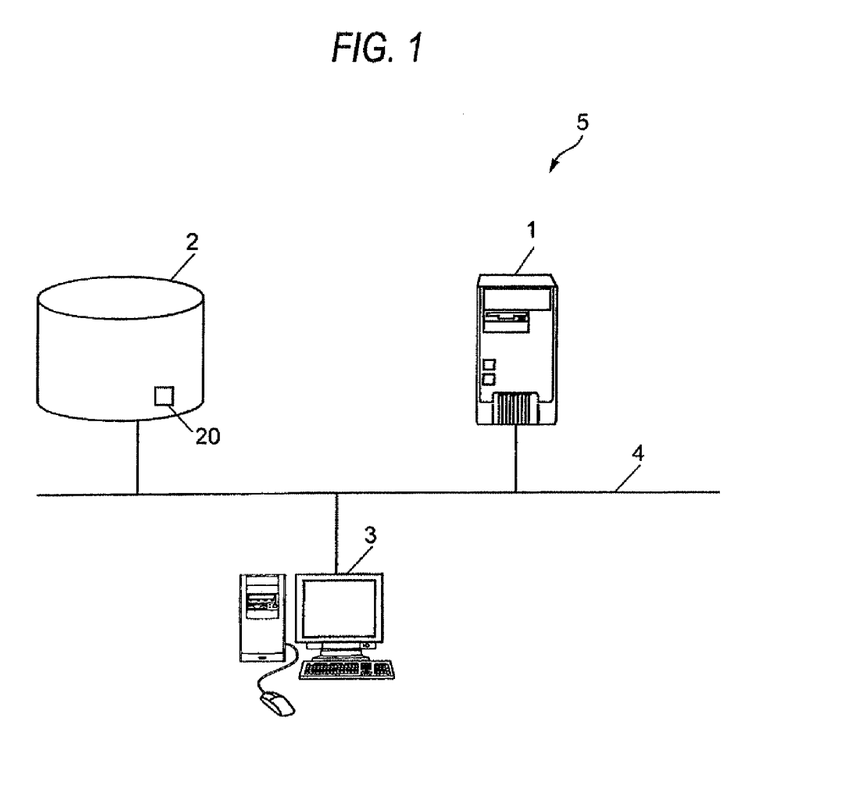
FIG. 1 is a schematic diagram showing an example of an information retrieval system in the first exemplary embodiment of the present invention.

FIG. 1 is a schematic diagram showing an example of the information retrieval system of the present invention.

This information retrieval system 5 is configured by connecting among an information retrieval server device 1, a document database 2 and a terminal device 3 so as to be communicable with one another through a network 4.

The information retrieval server device 1 is an information processing device having electronic components, such as a CPU (Central Processing Unit) and a storage unit for retrieving information responsive to a question sentence.

The document database 2 stores therein a plurality of documents 20 as an object to be searched for. The documents 20 are files created by a word processor, and a spreadsheet program or the like program, HTML documents, etc. A composition which is configured of one or more sentences shall be contained in each of the files mentioned above. Besides, an image file or a music file which contains a composition in its header or the like may be set as the document 20 to-be-retrieved.

The terminal device 3 is a device for accessing the information retrieval server device 1 and inputting a question sentence, and for displaying a retrieval result for the question sentence. This terminal device 3 has a manipulation unit for inputting a manipulation, a display unit such as a liquid-crystal display, and a control unit including electronic components such as a CPU and a storage unit. Incidentally, the terminal device 3 may be, for example, a personal computer, a PDA (Personal Digital Assistant), or a portable telephone. Besides, although one terminal device 3 is shown in FIG. 1, a plurality of terminal devices may be included in the information retrieval system.

The network 4 may be a LAN (Local Area Network), the Internet, or the like, and it may be either wired or wireless.

Here, the "question sentence" is a composition which is configured of a natural language, and it may have any length or any number of sentences. Besides, the "retrieval result" is a word, a sentence or a composition which is configured of the natural language, a document which contains the composition, a link for the document, or the like.

Figure 2:
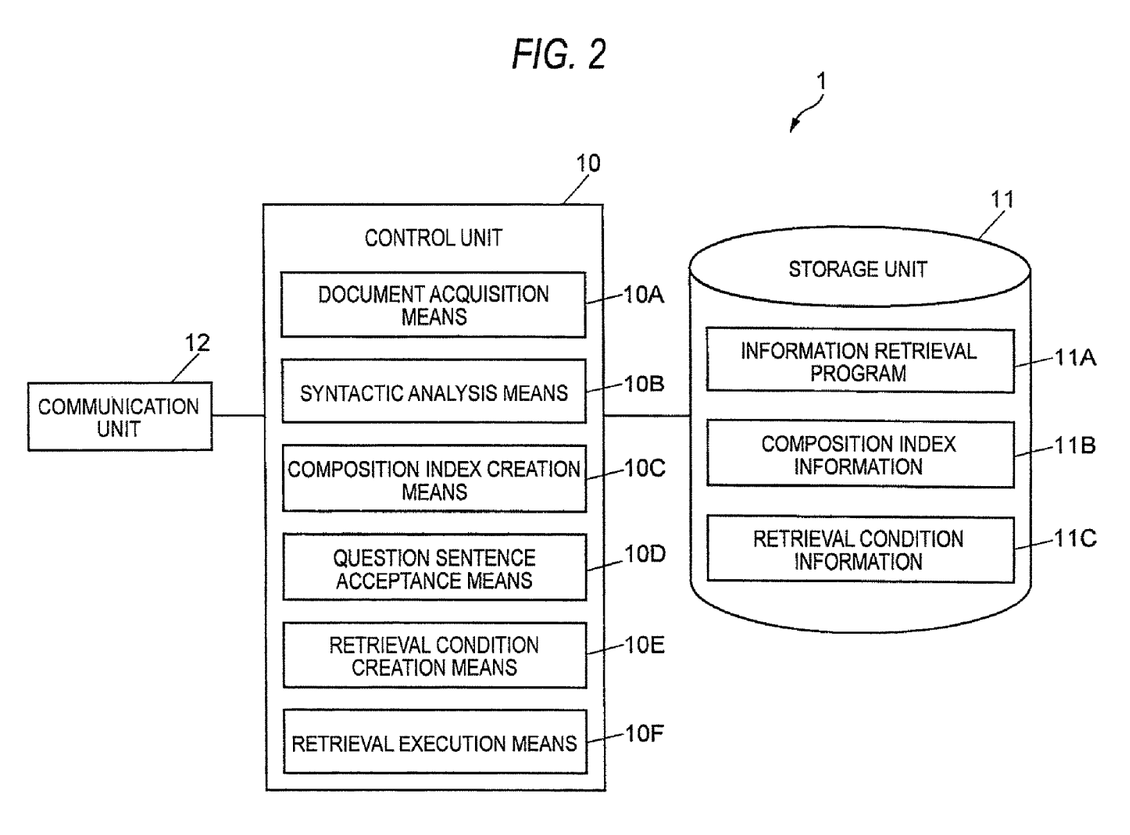
FIG. 2 is a schematic diagram showing an example of an information retrieval apparatus.

FIG. 2 is a schematic diagram showing an example of the information retrieval server device 1.

The information retrieval server device 1 includes a control unit 10 which is configured of a CPU etc. and which controls individual portions and runs various programs, a storage unit 11 which is configured of a storage medium such as an HDD (Hard Disk Drive) or a flash memory and in which information is stored, and a communication unit 12 which communicates with the exterior through the network 4.

The control unit 10 runs an information retrieval program 11A shown in FIG. 2 as will be stated later, thereby to function as document acquisition means 10A, syntactic analysis means 10B, composition index creation means 10C, question sentence acceptance means 10D, retrieval condition creation means 10E and retrieval execution means 10F.

The document acquisition means 10A accesses the document database 2 through the network 4, so as to acquire a document 20.

The syntactic analysis means 10B analyzes the syntax of a sentence which constitutes a composition contained in the document 20, or a question sentence which will be stated later.

The composition index creation means 10C creates composition index information 11B from the syntax of the sentence which is contained in the document 20 analyzed by the syntactic analysis means 10B

The question sentence acceptance means 10D accepts the question sentence inputted to the terminal device 3, through the network 4.

The retrieval condition creation means 10E creates retrieval condition information 11C from the syntax of the question sentence analyzed by the syntactic analysis means 10B.

The retrieval execution means 10F compares the composition index information 11B and the retrieval condition information 11C, so as to retrieve a sentence, a composition or a document containing the composition which agrees with a condition.

The storage unit 11 stores therein the information retrieval program 11A which causes the control unit 10 to operate as the respective means stated above, the composition index information 11B which is outputted from the composition index creation means 10C, and the retrieval condition information 11C which is outputted from the retrieval condition creation means 10E.

(Operation of Information Retrieval System)

Now, the operation of the information retrieval system 5 will be described separately for (1) the operation of creating composition index information, (2) the operation of inputting a question sentence, and (3) the operation of retrieving information, with reference to FIGS. 1 to 9B.

Incidentally, (1) the creation of the composition index information should desirably be previously done before (3) the execution of the retrieval of the information, for the purpose of enhancing a retrieval rate, and it is done regularly, for example, every second day, or when a new document has been added into the document database 2. Besides, (1) the creation of the composition index information may be executed with a trigger being (3) the execution of the retrieval of the information.

(1) Operation of Creating Composition Index Information

Figure 9A:
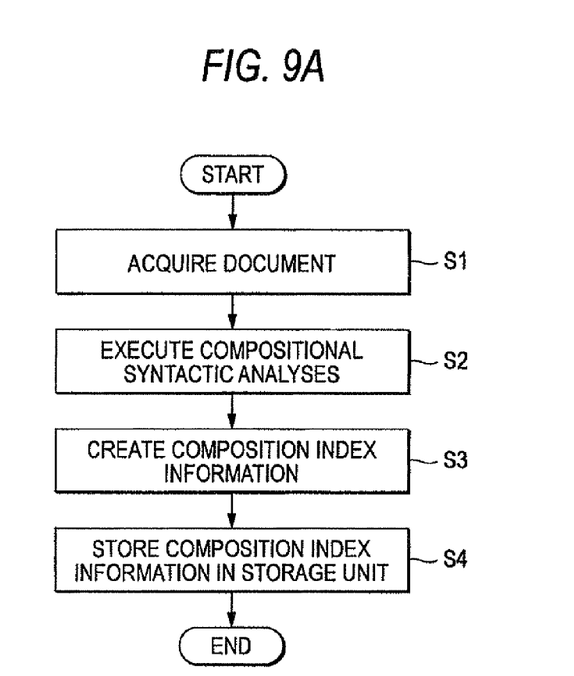
FIG. 9A is a flow chart showing an operating example of the information retrieval system.

FIG. 9A is a flow chart showing an operating example of the information retrieval system 5.

First, the document acquisition means 10A acquires documents 20 from the document database 2 in succession (S1). Incidentally, on this occasion, the document for which composition index information has already been created may be discriminated by, for example, erecting a flag indicative of the information creation and be skipped without being acquired.

Figure 3:
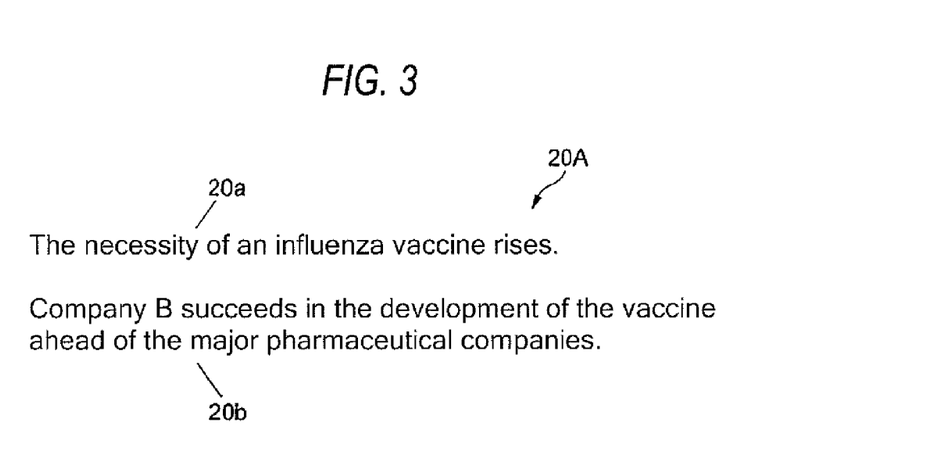
FIG. 3 is a schematic diagram showing an example of a document.

FIG. 3 is a schematic diagram showing an example of the acquired document 20 configured of Japanese.

A composition 20A is an example of a composition contained in the document 20, and it has a composition consisting of a first sentence 20a meaning "The necessity of an influenza vaccine rises" and a second sentence 20b meaning "Company B succeeds in the development of the vaccine ahead of the major pharmaceutical companies". Incidentally, although the composition of the document 20A is constituted by the two sentences in the example shown in the figure, it may be constituted by one sentence or three or more sentences.

Subsequently, the syntactic analysis means 10B executes the syntactic analysis of the composition contained in the acquired composition 20A and outputs a compositional syntactic analysis result (S2).

Figure 4A:
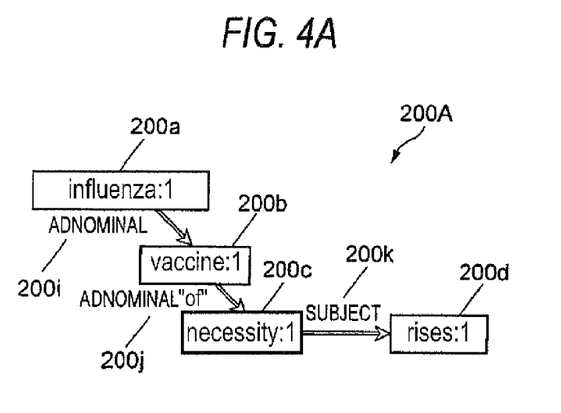
FIGS. 4A and 4B are schematic diagrams each showing an example of the syntactic analysis result of the document.
Figure 4B:
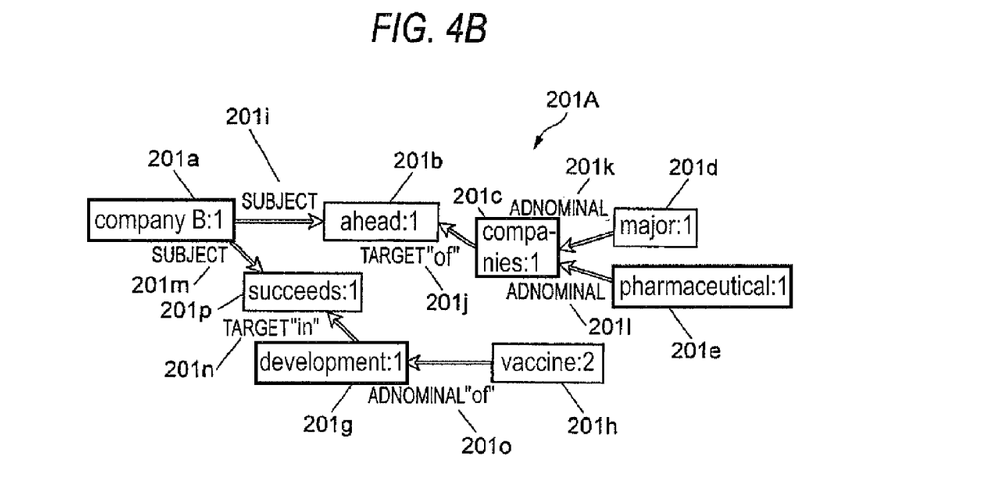

FIGS. 4A and 4B are schematic diagrams each showing an example of the compositional syntactic analysis result.

The compositional syntactic analysis result 200A shown in FIG. 4A is a result obtained in such a way that the first sentence 20a of the composition 20A has been subjected to the syntactic analysis by the syntactic analysis means 10B, and this result has a plurality of sentence elements 200a to 200d, and sentence element relations 200i to 200k which indicate the qualifying relations etc. among the sentence elements 200a to 200d. The composition is divided by the compositional syntactic analysis, and the sentence elements are individual character strings which are the results of the division.

Incidentally, the numeral with colon in each of the sentence elements 200a to 200d indicates the order in which the pertinent sentence element has appeared in the composition. Besides, the arrow of each of the sentence element relations 200i to 200k is depicted from the word of the argument of the pertinent relation to a head.

A compositional syntactic analysis result 201A shown in FIG. 4B is a result obtained in such a way that the second sentence 20b of the composition 20A has been subjected to the syntactic analysis by the syntactic analysis means 10B, and it has a plurality of sentence elements 201a to 201h, and sentence element relations 201i to 201o which indicate the qualifying relations etc. among the sentence elements 201a to 201h.

The compositional syntactic analysis results are obtained for the sentences contained in the composition, that is, for the first sentence 20a and the second sentence 20b, respectively. Besides, the syntactic analyses are concretely made by executing syntactic-semantic analyses for the first sentence 20a and the second sentence 20b, so as to divide the sentences into words and to analyze the qualifications and semantic relations of the words. Besides, the syntactic-semantic analyses are executed using a case frame lexicon, etc. not shown.

Subsequently, the composition index creation means 10C creates composition index information on the basis of the compositional syntactic analysis results 200A and 201A (S3). The composition index information is created every composition.

Figure 5:
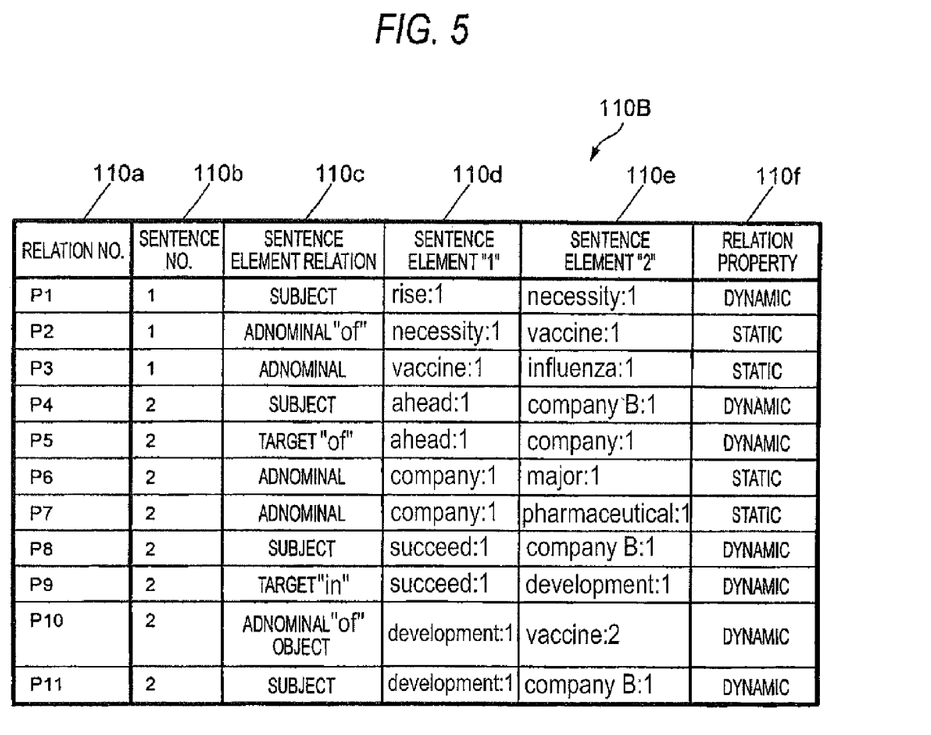
FIG. 5 is a schematic diagram showing an example of composition index information.

FIG. 5 is a schematic diagram showing an example of the composition index information 11B.

Composition index information 110B is an example of the composition index information 11B, and it is information created by the composition index creation means 10C from the compositional syntactic analysis results 200A and 201A shown in FIGS. 4A and 4B, respectively. Incidentally, the relation between "Company B: 1" and "(make) development: 1" may not be directly read from the compositional syntactic analysis result 200A, but "development: 1" preceding "succeed: 1" is a noun based on the irregular conjugation verb of the s series in the Japanese language, and the subject of "succeed: 1" also becomes the subject of "(do) development: 1", so that the composition index creation means 10C adds the relation of both the words as a relation P11 in the composition index information 110B.

The composition index information 110B has a relation No. column 110a which contains the identifiers of sentence element relations, a sentence No. column 110b which indicates the Nos. of sentences in a document, a sentence element relation column 110c which indicates the relations between sentence elements, a sentence element "1" column 110d which indicates the heads of the sentence elements, a sentence element "2" column 110e which indicates the arguments of the sentence elements, and a relation property column 110f which indicates the properties of the sentence element relations.

The relation property column 110f is determined to be "dynamic" for a verb-like usage which is decided using a predetermined case frame lexicon, etc. from the sentence element relation, and to be "static" for any other. Incidentally, the "case frame lexicon" is a lexicon in which the case relations of verbs are described, and a subject and an object are presumed from the cases of the verbs.

Subsequently, the composition index creation means 10C additionally stores the created composition index information 110B in the composition index information storage area 11B of the storage unit 11, together with the identification information of the document 20 (S4). The composition index information 110B is created as to all the documents 20 which are stored in the document database 2.

(2) Operation of Inputting Question Sentence

Subsequently, a user who makes a request for the retrieval of information inputs a desired question sentence by manipulating the manipulation unit of the terminal device 3. The control unit of the terminal device 3 requests the information retrieval server device 1 to execute the retrieval, through the network 4, and it transmits the question sentence inputted by the user.

(3) Operation of Retrieving Information

Figure 9B:
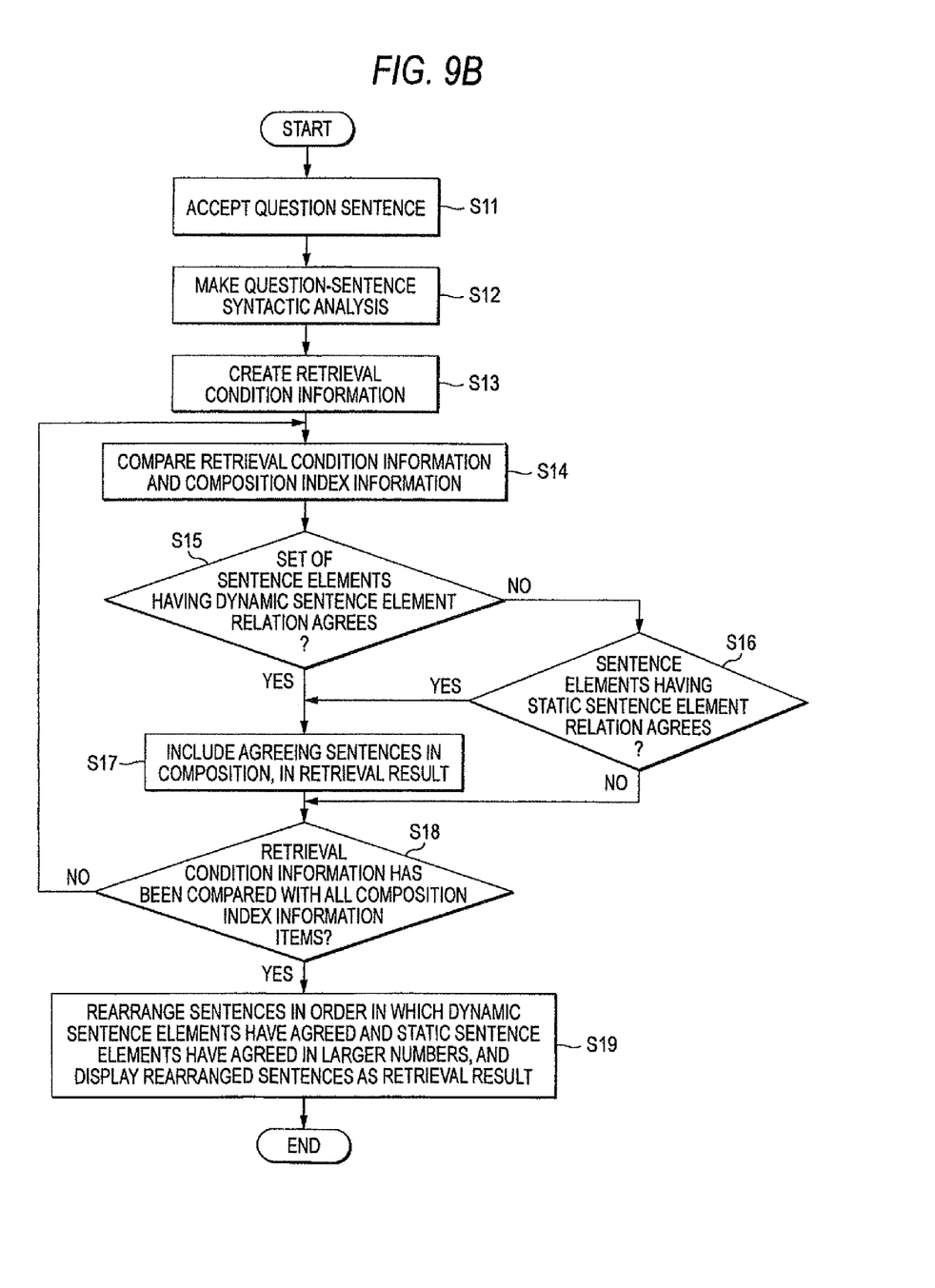
FIG. 9B is a flow chart showing an operating example of the information retrieval system.

FIG. 9B is a flow chart showing an operating example of the information retrieval system 5.

First, the question sentence acceptance means 10D accepts the question sentence from the terminal device 3 (S11).

Figure 6:
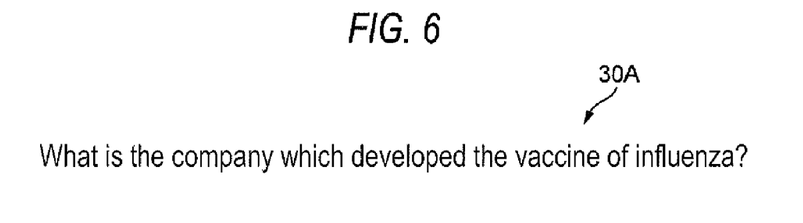
FIG. 6 is a schematic diagram showing an example of a question sentence which is accepted by question sentence acceptance means.

FIG. 6 is a schematic diagram showing an example of the question sentence in Japanese.

The question sentence 30A is a composition created in such a way that the user inputted the question sentence to the manipulation unit of the terminal device 3, and it means "What is the company which developed the vaccine of influenza?" Incidentally, although the question sentence 30A is constituted by one sentence in the example shown in the figure, it may be a composition constituted by two or more sentences.

Subsequently, the syntactic analysis means 10B subjects the acquired question sentence 30A to a syntactic analysis and outputs a question-sentence syntactic analysis result (S12). When the question sentence is the composition constituted by the plurality of sentences, the syntactic analysis is executed every sentence.

Figure 7:
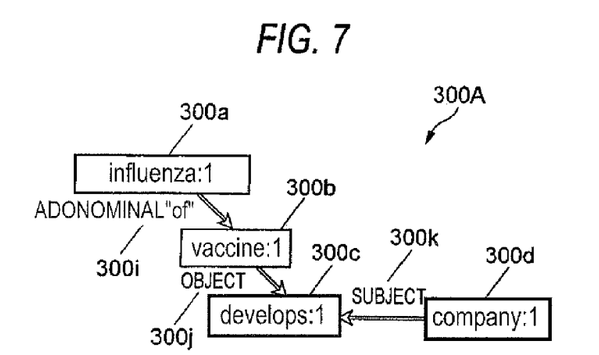
FIG. 7 is a schematic diagram showing an example of the syntactic analysis result of the question sentence.

FIG. 7 is a schematic diagram showing an example of the question-sentence syntactic analysis result.

The question-sentence analysis result 300A is a result obtained in such a way that the question sentence 30A has been syntactically analyzed by the syntactic analysis means 10B, and it has a plurality of sentence elements 300a to 300d, and sentence element relations 300i to 300k which indicate the qualifying relations among the sentence elements 300a to 300d.

Subsequently, the retrieval condition creation means 10E creates retrieval condition information shown in FIG. 8, on the basis of the question-sentence syntactic analysis result 300A (S13). Incidentally, the retrieval condition information is created as one retrieval condition information even in a case where the question sentence is constituted by a plurality of sentences.

Figure 8:
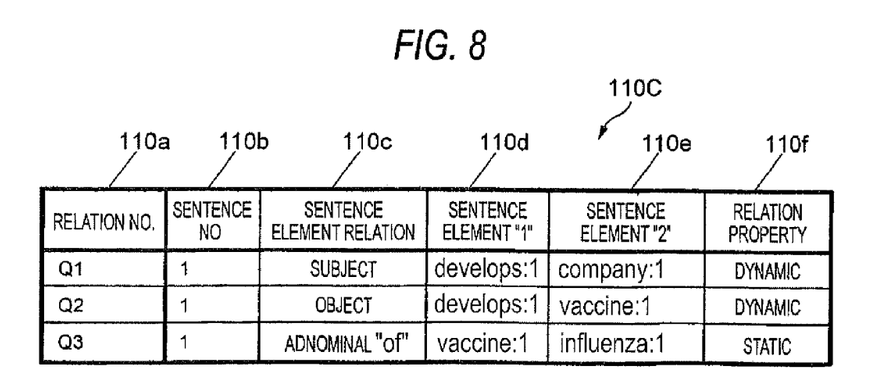
FIG. 8 is a schematic diagram showing an example of retrieval condition information.

FIG. 8 is a schematic diagram showing an example of the retrieval condition information.

The retrieval condition information 110C is an example of the retrieval condition information 11C, and it is information created by the retrieval condition creation means 10E from the question-sentence syntactic analysis result 300A shown in FIG. 7.

Likewise to the composition index information 110B, the retrieval condition information 110C has a relation No. column 110a, a sentence No. column 110b, a sentence element relation column 110c, a sentence element "1" column 110d, a sentence element "2" column 110e, and a property column 110f.

Subsequently, the retrieval execution means 10F compares one composition index information 110B of the plurality of composition index information items created in correspondence with the plurality of documents 20 stored in the database 2, with the retrieval condition information 110C (S14). Concretely, those sentence elements of the information items 110B and 110C which agree in the sentence element relation column 110c and the sentence element "1" column 110d are extracted.

Subsequently, regarding the sentence elements whose relation property columns 110f are "dynamic", among the sentence elements extracted at the step S14, as to which the sentence element relation column 110c and either the sentence element "1" column 110d or the sentence element "2" column 110e agree, the document corresponding to the composition index information 110B is included in the retrieval result (S16) in the existence of the sentence elements both of which agree in either the sentence element "2" column 110e or the sentence element "1" column 110d (S15; Yes).

Regarding, for example, Q1 in the retrieval condition information 110C shown in FIG. 8, the relation property is "dynamic", and a subject for "develops: 1" is "company: 1". Here, as regards "company" and "company-B", when it has been found that the subordinate concept of "company: 1" is "company-B", from a word lexicon for the syntactic-semantic analysis, not shown, the retrieval execution means 10F may judge that Q1 agrees with P11 in the composition index information 110B shown in FIG. 5.

Besides, in a case at the step S15 where the sentence elements agree in the sentence element relation column 110c and the sentence element "1" column 110d, and where the relation property column 110f is "dynamic", but where the sentence elements do not agree in the sentence element "2" column 110e (S15; No), the corresponding document is not included in the retrieval result. It is judged that Q1 and P11, for example, do not agree.

Subsequently, of the sentence elements agreeing in the sentence element relation column 110c and the sentence element "1" column 110d as have been extracted at the step S14, ones as to which the relation property column 110f is "static" (S16; Yes) may agree in either the sentence element "1" column 110d or the sentence element "2" column 110e. By way of example, "vaccine" of Q2 is "dynamic" in the relation property, and hence, the sentence elements need to agree in "develop" of the sentence element and "object of adnominal "of"" of the sentence element relation. However, "vaccine" of Q3 is "static" in the relation property, and hence, the sentence elements are judged to agree, subject to the agreement thereof in "vaccine" despite the disagreement thereof in "influenza". Then, the step S15 or S16 is followed by a step S17.

Owing to the above operations, the retrieval execution means 10F judges that Q1 Q2 and Q3 shown in FIG. 8 agree with P11, P10 and P3 shown in FIG. 5, respectively, and it includes the first sentence 20a and the second sentence 20b in the retrieval result (S17) because the sentence Nos. of P11, P10 and P3 are "2", "2" and "1", respectively.

The above steps S14 to S17 are executed for all the composition index information items 11B (S18). The corresponding sentences (or compositions each consisting of a plurality of sentences) in the document are rearranged in the order of the number of the sentences as to which all the sentence elements having the dynamic sentence element relations have agreed and the number of the sentences as to which the sentence elements having the static sentence element relations have agreed, and the rearranged sentences are displayed as the retrieval result (S19).

Incidentally, regarding the rearrangement of the document, priority may be given to either the agreement of the dynamic sentence element relation or the agreement of the static sentence element relation, and it is also allowed to employ a configuration in which the priority may be selectively set by the user.

Besides, regarding the display of the retrieval result, the whole document may be displayed, only the composition in the document may be displayed, the sentence in the composition as has agreed in the sentence element may be highlighted and displayed, or only the sentence which has agreed in the sentence element may be extracted and displayed. In the case where the document is the image or music file, the document itself is displayed together with the sentence elements having agreed.

[Second Exemplary Embodiment]

In an information retrieval system according to the second exemplary embodiment of the present invention, documents 20 and a question sentence are configured of a language other than Japanese, for example, of English, and syntactic analysis means 10B, composition index creation means 10C and retrieval condition creation means 10E are configured so as to conform to the other language. The others are configured in the same manner as in the first exemplary embodiment. Incidentally, an information retrieval system may well handle documents 20 and question sentences which contain a plurality of languages. Besides, operations to be stated below are similar to the operations in FIG. 9B.

First, the question sentence acceptance means 10D accepts the question sentence from the terminal device 3 (S11).

Figure 10:
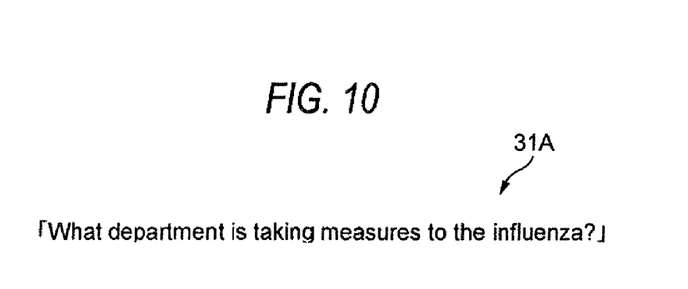
FIG. 10 is a schematic diagram showing another example of a question sentence which is accepted by question sentence acceptance means in the second exemplary embodiment.

FIG. 10 is a schematic diagram showing an example of the question sentence which is accepted by the question sentence acceptance means 10D in the second exemplary embodiment.

The question sentence 31A is a composition inputted and created in such a way that a user manipulates the manipulation unit of the terminal device 3, and it has a sentence stated in English; "What department is taking measures to the influenza?"

Subsequently, the syntactic analysis means 10B syntactically analyzes the acquired question sentence 31A and outputs a question-sentence syntactic analysis result (S12).

Figure 11:
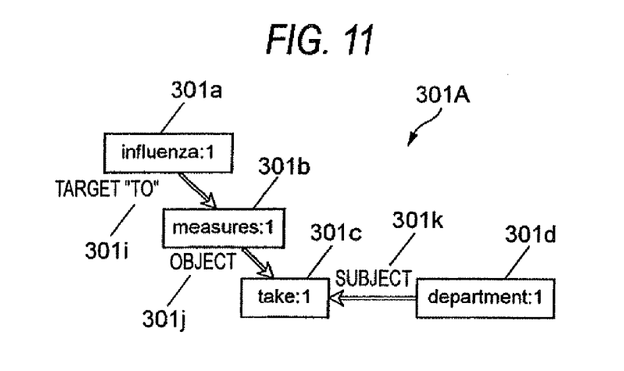
FIG. 11 is a schematic diagram showing an example of the syntactic analysis result of the question sentence.

FIG. 11 is a schematic diagram showing an example of the question-sentence syntactic analysis result.

The question-sentence analysis result 301A is a result obtained in such a way that the question sentence 31A has been syntactically analyzed by the syntactic analysis means 10B, and it has a plurality of sentence elements 301a to 301d consisting chiefly of words, and sentence element relations 301i to 301k indicating the qualifying relations among the sentence elements 301a to 301d.

Subsequently, the retrieval condition creation means 10E creates retrieval condition information on the basis of the question-sentence syntactic analysis result 301A (S13).

Figure 12:
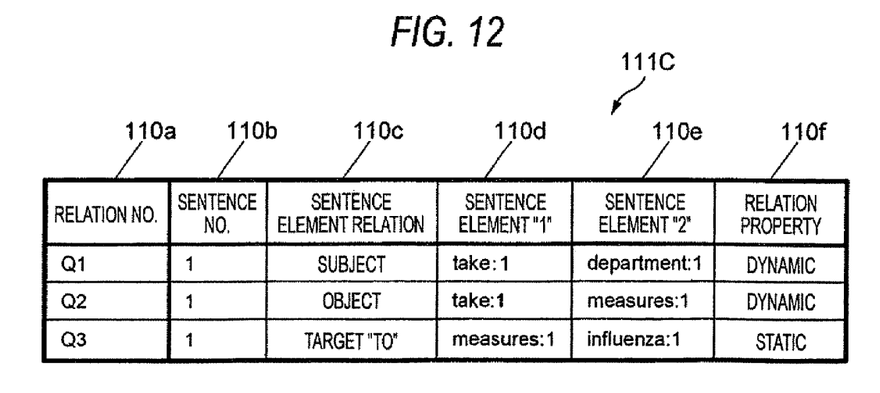
FIG. 12 is a schematic diagram showing another example of retrieval condition information.

FIG. 12 is a schematic diagram showing an example of the retrieval condition information.

The retrieval condition information 111C is the example of the retrieval condition information 11C, and it is information created from the question-sentence syntactic analysis result 301A shown in FIG. 11, by the retrieval condition creation means 10E.

Likewise to the composition index information 110B, the retrieval condition information 111C has a relation No. column 110a, a sentence No. column 110b, a sentence element relation column 110c, a sentence element "1" column 110d, a sentence element "2" column 110e and a property column 110f.

As stated above, even in the case of the language other than Japanese, the retrieval condition information 111C is created on the basis of the operations shown in FIG. 9B, and also the composition index information 11B is subsequently created on the basis of the operations shown in FIG. 9A. Further, the retrieval execution means 10F operates in the same manner as in the first exemplary embodiment and obtains answers corresponding to the desired question sentence, from the document 20.

[Other Exemplary Embodiments]

Incidentally, the present invention is not restricted to the foregoing exemplary embodiments, but it is capable of various modifications within a scope not departing from the purport of the present invention. In a case, for example, where structured compositions such as chapter compositions are subjects to-be-retrieved, a retrieval range and a retrieval result may be restricted in such a way that the composition index creation means 10C creates the composition index information 11B every chapter. Besides, the retrieval execution means 10F may well restrict the retrieval range and output the retrieval result every chapter.

Besides, the document acquisition means 10A, the syntactic analysis means 10B, the composition index creation means 10C, the question-sentence acceptance means 10D, the retrieval condition creation means 10E and the retrieval execution means 10F which are used in the exemplary embodiments may be loaded from a CD-ROM or the like storage medium into the storage unit within the apparatus, or they may be downloaded from a server apparatus or the like connected to the Internet or the like network, into the storage unit within the apparatus. Besides, some or all of the means used in the exemplary embodiments may be incarnated by hardware such as ASIC.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A non-transitory computer-readable medium storing a program causing a hardware processor to execute a process for retrieving information, the process comprising:
   accepting a second composition, which is a retrieval condition that includes second sentence elements;
   executing a syntactic analysis of (i) a first composition, which is an object to be searched that includes first sentence elements, and (ii) the second composition, the syntactic analysis (a) extracting from the first composition the first sentence elements, (b) extracting from the second composition the second sentence elements, (c) creating a first sentence element relation, which is a relation between the first sentence elements, and (d) creating a second sentence element relation, which is a relation between the second sentence elements;
   creating composition index information, which includes the first sentence elements and the first sentence element relation, based on a result of the syntactic analysis;
   creating retrieval condition information, which includes the second sentence elements and the second sentence element relation, based on the result of the syntactic analysis; and
   determining the first composition corresponding to the composition index information as a retrieval result for the retrieval condition, when a pair of the second sentence elements included in the retrieval condition information and having the second sentence element relation of a predetermined property corresponds to a pair of the first sentence elements included in the composition index information, wherein
   the predetermined property is determined to be dynamic when the second sentence element relation is a verb-like usage,
   the predetermined property is determined to be static when the second sentence element relation is not a verb-like usage, and
   the determining includes determining whether the pair of the second sentence elements corresponds to the pair of the pair of the first sentence elements when the predetermined property is dynamic, and determining whether one of the pair of the second sentence elements corresponds to one of the pair of the first sentence elements when the predetermined property is static.

2. The non-transitory computer-readable medium of claim 1, wherein
   in the determining step, when one member of the pair of first sentence elements having the first sentence element relation is a verb indicating an operation or a change, the first sentence element relation is considered as one of a plurality of predetermined sorts of sentence element relations.

3. The non-transitory computer-readable medium of claim 1, wherein
   in the determining step, when one member of the pair of first sentence elements having the first sentence element relation is a verb indicating an operation or a change, the first sentence element relation is considered as one of a plurality of predetermined sorts of sentence element relations.

4. An information retrieval apparatus comprising:
   a syntactic analysis unit that extracts first sentence elements from a first composition which is an object to be searched, extracts second sentence elements from a second composition which is a retrieval condition, and executes a syntactic analysis of the first composition and the second composition, the syntactic analysis resulting in a first sentence element relation which is a relation between first sentence elements and a second sentence element relation which is a relation between second sentence elements;
   a composition index creation unit that creates composition index information, which includes the first sentence elements and the first sentence element relation, based on a result of the syntactic analysis;
   a retrieval condition creation unit that creates retrieval condition information, which includes the second sentence elements and the second sentence element relation, based on the result of the syntactic analysis; and
   a retrieval unit that determines the first composition as a retrieval result for the retrieval condition, when a pair of the second sentence elements included in the retrieval condition information and having the second sentence element relation of a predetermined property corresponds to a pair of the first sentence elements included in the composition index information, wherein
   the predetermined property is determined to be dynamic when the second sentence element relation is a verb-like usage,
   the predetermined property is determined to be static when the second sentence element relation is not a verb-like usage, and
   the determining includes determining whether the pair of the second sentence elements corresponds to the pair of the pair of the first sentence elements when the predetermined property is dynamic, and determining whether one of the pair of the second sentence elements corresponds to one of the pair of the first sentence elements when the predetermined property is static.

5. An information retrieving method comprising:
   accepting a second composition, which is a retrieval condition that includes second sentence elements;
   executing a syntactic analysis of (i) a first composition, which is an object to be searched that includes first sentence elements, and (ii) the second composition, the syntactic analysis (a) extracting from the first composition the first sentence elements, (b) extracting from the second composition the second sentence elements, (c) creating a first sentence element relation, which is a relation between the first sentence elements, and (d) creating a second sentence element relation, which is a relation between the second sentence elements;
   creating composition index information, which includes the first sentence elements and the first sentence element relation, based on a result of the syntactic analysis;
   creating retrieval condition information, which includes the second sentence elements and the second sentence element relation, based on the result of the syntactic analysis; and
   determining the first composition corresponding to the composition index information as a retrieval result for the retrieval condition, when a pair of the second sentence elements included in the retrieval condition information and having the second sentence element relation of a predetermined property corresponds to a pair of the first sentence elements included in the composition index information, wherein
   the predetermined property is determined to be dynamic when the second sentence element relation is a verb-like usage,
   the predetermined property is determined to be static when the second sentence element relation is not a verb-like usage, the determining includes determining whether the pair of the second sentence elements corresponds to the pair of the pair of the first sentence elements when the predetermined property is dynamic, and determining whether one of the pair of the second sentence elements corresponds to one of the pair of the first sentence elements when the predetermined property is static.

* * * * *